United States Patent
Veres

(10) Patent No.: US 12,073,236 B2
(45) Date of Patent: Aug. 27, 2024

(54) CLASS LOADING OF DEPENDENCY CLASS FILES USING MODIFIED CLASS IDENTIFIERS

(71) Applicant: RED HAT, INC., Raleigh, NC (US)

(72) Inventor: Stefan Veres, Adamov (CZ)

(73) Assignee: Red Hat, Inc., Raleigh, NC (US)

( * ) Notice: Subject to any disclaimer, the term of this patent is extended or adjusted under 35 U.S.C. 154(b) by 169 days.

(21) Appl. No.: 17/900,106

(22) Filed: Aug. 31, 2022

(65) Prior Publication Data
US 2024/0069930 A1  Feb. 29, 2024

(51) Int. Cl.
G06F 9/445 (2018.01)
G06F 8/41 (2018.01)

(52) U.S. Cl.
CPC .......... *G06F 9/44521* (2013.01); *G06F 8/433* (2013.01); *G06F 9/44536* (2013.01); *G06F 9/44578* (2013.01)

(58) Field of Classification Search
None
See application file for complete search history.

(56) References Cited

U.S. PATENT DOCUMENTS

| | | | |
|---|---|---|---|
| 8,438,532 B2 | 5/2013 | Fox et al. | |
| 8,612,930 B2 | 12/2013 | Quinn et al. | |
| 8,738,589 B2 | 5/2014 | Stark et al. | |
| 9,135,263 B2 | 9/2015 | Fox | |
| 9,141,408 B2 | 9/2015 | Jackson et al. | |
| 9,298,448 B2 | 3/2016 | Nguyen et al. | |
| 9,875,097 B2 | 1/2018 | Casey et al. | |
| 2004/0153996 A1 | 8/2004 | Boykin et al. | |
| 2014/0130016 A1* | 5/2014 | Menghrajani | G06F 11/3604 717/124 |
| 2016/0103692 A1* | 4/2016 | Guntaka | G06F 9/4401 713/2 |
| 2021/0049024 A1 | 2/2021 | Ruder et al. | |
| 2023/0409417 A1* | 12/2023 | Kanvar | G06F 9/547 |

OTHER PUBLICATIONS

Miedes et al., Joint Technological University Institute of Informatics Polytechnic University of Valencia, Spain, "Software Adaptation through Dynamic Updating", https://citeseerx.ist.psu.edu/viewdoc/download?doi=10.1.1.1077.4571&rep=rep1&type=pdf, Sep. 28, 2012, 29 pages.

* cited by examiner

*Primary Examiner* — Craig C Dorais
(74) *Attorney, Agent, or Firm* — Dority & Manning, P.A.

(57) ABSTRACT

Systems and methods for class loading of dependency class files using modified class identifiers. An example method may comprise packaging one or more class files into a logical group for building an executable module to be deployed in a computing environment; assigning a class identifier to a class file of the logical group, wherein the class identifier comprises a class name and a project identifier; identifying a dependency class file of the class file of the logical group; and adding, to a build management data structure, an entry comprising the class identifier and a class identifier of the dependency class file.

17 Claims, 4 Drawing Sheets

| CLASS FILE ID 210 | DEPENDENT CLASS FILE ID 220 |
|---|---|
| ID of Class File A1 | ID of Class File B1 |
| ID of Class File A2 | ID of Class File B2 |
| ID of Class File A3 | ID of Class File B3 |
| ID of Class File A4 | ID of Class File B4 |
| ID of Class File B1 | ID of Class File C1 |
| ID of Class File B2 | ID of Class File C2 |
| ID of Class File B3 | ID of Class File C3 |
| ID of Class File B4 | ID of Class File C4 |
| ID of Class File C1 | ID of Class File D1 |
| ID of Class File C2 | ID of Class File D2 |
| ID of Class File C3 | ID of Class File D3 |

FIG. 2

CLASS LOADING OF DEPENDENCY CLASS FILES USING MODIFIED CLASS IDENTIFIERS

TECHNICAL FIELD

Embodiments of the present disclosure relate to virtualization systems, and more specifically, relate to class loading of dependency class files using modified class identifiers.

BACKGROUND

Class loading is a mechanism of a Java Virtual Machine (JVM) for controlling the class paths of deployed applications. In particular, class loading is a mechanism performed by class loaders in the JVM to load Java classes for a Java application into the JVM. During development of Java applications, developers may fine tune control of the classes loaded to their applications.

BRIEF DESCRIPTION OF THE DRAWINGS

Disclosure is illustrated by way of example, and not by way of limitation, and may be more fully understood with references to the following detailed description when considered in connection with the figures, in which:

FIG. 2 illustrative an example build management data structure for use in class loading dependency class files using modified class identifiers, in accordance with embodiments of the present disclosure.

DETAILED DESCRIPTION

Figure 1:
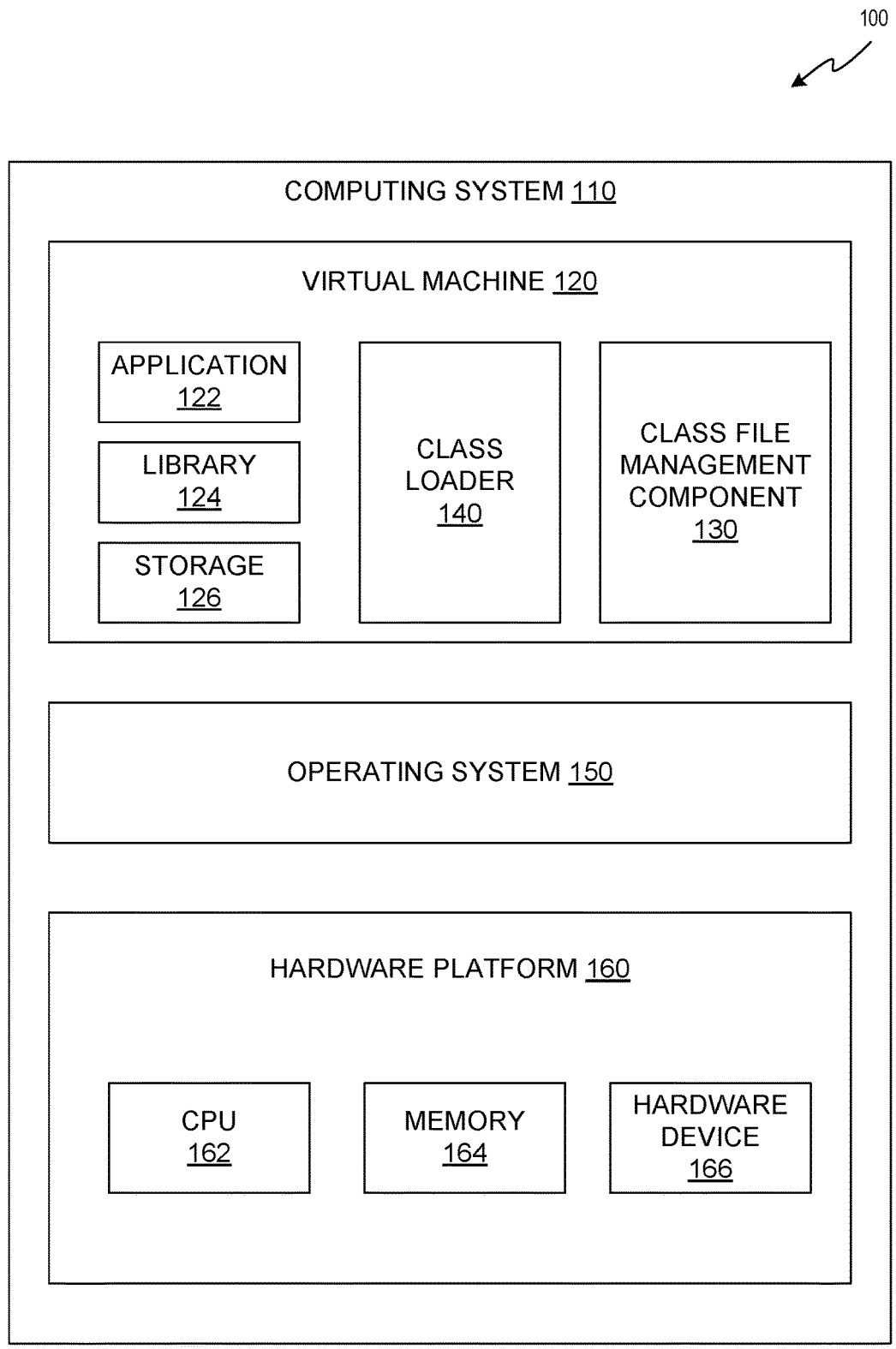
FIG. 1 illustrates a high-level component diagram of an example architecture for a virtualization system, in accordance with one or more aspects of the present disclosure.

Described herein are methods and systems for class loading of dependency class files using modified class identifiers. Managed computer systems allow an application (e.g., represented by one or more executable files produced by a build process) to be executed on any platform regardless of the underlying hardware or operating system (e.g., virtual machine, such as the Java™ Virtual Machine (JVM)). Applications that are written in Java programming language (e.g., a Java application) contain source files (e.g., .java files) that are compiled into virtual machine-readable bytecode (e.g., class files) which may have a class extension. In some implementations, class files may be organized into logical groups (e.g., modules) which may be represented as .jar files. Each module may define another module for which the module depends and so on. Module dependency may result in a declaration that one module requires the classes of another module in order to function.

In some implementations, upon loading a module, a class loader may parse the dependencies of that module and add the classes from each dependency to its class path. In some implementations, the dependencies of that module may include multiple different versions of the same class. A module's class path contains only the classes of the module and that of the immediately dependent module, thus a module is unable to access the classes of the dependencies of one of the immediately dependent dependencies.

In some implementations, to avoid multiple copies of the same class within the modules class path from conflicting with each other, the class loader utilizes a precedence rule. The precedence rule indicates an order of the different types of dependencies (e.g., implicit dependencies, explicit dependencies, local resources, inter-module dependencies) in which the class loader must load classes. Accordingly, during deployment, a complete list of classes is created for each module and corresponding dependencies. The list is ordered according to the precedence rule. When loading classes at runtime, the class loader searches this list (utilizing Class.forName method known in Java programming language with a class identifier to load a desired class file), and loads the first match, thereby preventing multiple copies of the same classes within the modules class path from conflicting with each other.

In other implementations, to avoid multiple copies of the same class within the modules class path from conflicting with each other, when loading classes at runtime, the class loader parses the modules and corresponding dependencies (utilizing Class.forName with a class identifier) for the shortest path to the class that matches the class identifier.

Aspects of the present disclosure address the above-noted and other deficiencies by providing methods and systems for class loading of dependency class files using modified class identifiers. Each class file packaged into a logical group for building an executable module is assigned a class identifier. The class identifier includes a class name (e.g., a fully qualified class name) and a project identifier (e.g., a full project identifier). The project identifier includes a group identification, an artifact identification, and/or a version identification of the class file. The project identifier may be generated by a build and project managing automation tool (e.g., Maven) to build and manage each version of the class file. The build automation tool may determine that there was a change to the class file and build the class file and provide the new build with a project identifier.

Each class file (of a logical group) may depend on a dependency class file (of a dependent logical group). A build management data structure may be generated to maintain the dependency between each class file and their corresponding dependency class file. In particular, each entry of the build management data structure may include a primary class identifier (e.g., a class identifier of a class file) and a secondary class identifier (e.g., a class identifier of a dependency class file referenced by the class file).

In response to a class loader loading an executable module associated with a logical group, the class loader may identify a dependency class file referenced by a class file. In particular, the class loader may obtain a class name or a class identifier of a dependency class file referenced by the class file. The class loader may identify an entry of the build management data structure in which a class identifier (or class name) of the class file matches a primary class identifier (or a class name portion of the primary class identifier) and the class name or class identifier of the dependency class file matches a secondary class identifier (or class name portion of the secondary class identifier). Once the entry is identified, the class loader may load a version of the dependency class file associated with the secondary class identifier.

Accordingly, aspects of the present disclosure improves accuracy and transparency of class loading, thereby providing the ability to identify which version of a class file was included in a class path of a module or to utilize more versions of the same class at the same time.

FIG. 1 illustrates a virtualization system 100 in which embodiments of the present disclosure may operate. It should be noted that other architectures for virtualization system 100 are possible, and that the implementation of a virtualization system 100 utilizing embodiments of the disclosure are not necessarily limited to the specific architecture depicted by FIG. 1.

Virtualization system 100 may include a Computing system 110 which can include a hardware platform 160, an operating system 150 that executes on the hardware platform 160 and a virtual machine 120.

Computing system 110 may be a server, a server cluster, a workstation, a personal computer (PC), a mobile device, a tablet computer, a laptop computer, or any other device, machine, or cluster of machines capable of hosting a virtual machine. The computer system 100 can be communicably connected to a network (not shown), such as a private network (e.g., a local area network (LAN), wide area network (WAN), intranet, etc.) or a public network (e.g., the Internet). Operating system (OS) 150 may be a Microsoft® Windows® OS, Linux® OS, Solaris® OS, Android® PS, Apple® iOS®, etc.

Hardware platform 160 may include one or more central processing units (CPU) 162, memory 164 and at least one hardware device 166. Examples of hardware devices 166 include network interface cards (NICs), sound or video adaptors, photo/video cameras, printer devices, keyboards, displays or any other suitable device intended to be coupled to a computer system.

Virtual machine 120 can be implemented to run on any operating system 150, and can also be implemented to run directly on any hardware platform 160. The virtual machine 120 may be a portion of software that can execute platform-independent bytecode in any programming language. Virtual machine 120 can translate bytecode into executable instructions at runtime (e.g., on the fly) and immediately executes the instructures. Bytecode can be code in a standardized portable binary format that may be used, for example, to create an application 122. Bytecode can have the form of one or more class files (e.g., Java class files) and is executed by the virtual machine 120.

The virtual machine 120 can be a Java Virtual Machine (JVM) that can execute bytecode in various programming language, such as Java, Armed Bear Common Lisp, Clojure, Erjang, Fantom, Free Pascal, Gosu, Groovy, Jacl, JavaFX Script, JRuby, Jython, Kotlin, NetRexx, Processing, Quercus, Rhino, Scala, etc. In one implementation, JVM can execute application 122 comprised of Java bytecode such as a Java class file, where the Java class file contains Java bytecode that can be executed on the JVM. Application 122 may include one or multiple Java class files.

The virtual machine 120 can include a bytecode library 124, an application 122, an allocated storage 126, a class loader 140, and a class file management component 130. Bytecode library 124 is a collection of bytecode (e.g., class files, etc.). Bytecode library 124 may be a dynamic loadable library that application 122 can call at runtime. The bytecode library 124 can provide the virtual machine 120 a well-known set of functions to perform common tasks. When the virtual machine 120 is instantiated, the bytecode library 124 can be loaded with a default set of standard bytecode (e.g., a default set of class files). In one implementation, the virtual machine is a JVM, the bytecode library 124 is a Java class library.

Class file management component 130 may package one or more class files into logical groups (e.g., an archive file). Examples of archive files include Java archive (.jar) files, web archive (.war) files, etc. The class file management component 130 may provide each of the one or more class files in the logical group with a class identifier. The class identifier may include a class name associated with the class file and a project identifier associated with the logical group the class file was packaged. The project identifier may be generated by a build automation tool (e.g., Maven) responsive to packaging of the one or more class file. The project identifier may include a group identification, an artifact identification, and/or a version identification. Accordingly, each class file of each logical group is assigned a class identifier which indicates a class name associated with the class file and a project identifier indicating which logical group the class file is packaged. In some embodiments, the class file management component 130 may be included in class loader 140.

Class file management component 130 may further generate a build management data structure stored in the allocated storage 126. For each logical group of a plurality of logical groups, the class file management component 130 may identify a dependent logical group referenced by a respective logical group. Class file management component 130 may, for each class file of the respective logical group, identify a dependency class file of the dependent logical group referenced by a respective class file of the respective logical group, and append an entry to the build management data structure including a first class identifier associated with a class identifier of the respective class file of the respective logical group and a second class identifier associated with a class identifier of the dependency class file of the dependent logical group.

Dependent logical groups are identified by separate metadata document adjacent to the project. For example, with respect to Maven, a metadata file (e.g., pom.xml file) includes a section designated as <dependencies> which defines dependencies of the project. In another example, with respect to java code, an "import section" may be included at the beginning of each class, in which classes from other projects may be imported (i.e., to be further used in the java code). Java code may specify, for example, only fully qualified class name which excludes information associated with the version of the project. The information associated with the version of the project (e.g., project management info) may be stored in the metadata file of Maven (e.g., the pom.xml file). Accordingly, due to the recursive nature, dependent projects may include additional a project management (pom.xml) for all dependencies and their respective transitive dependencies of the project (i.e., dependencies of direct dependencies). The dependencies and their respective transitive dependencies may form a "dependency tree" of the project.

Class loader 140 can load the class files of the logical group into the allocated storage 126 for use by the application 122. In some instances, the class files of the logical group may reference class files of another logical group (e.g., a dependent logical group) by class name. Accordingly, the class files (of the dependent logical group) referenced by the logical group needs to be retrieved from the appropriate dependent logical group and loaded into the allocated storage 126 for use by the application 122.

Class loader 140 may, for each class file of the logical group, identify a class name referenced by the class file. The class loader 140 may identify an entry of the build management data structure in which a class identifier of the class file of the logical group matches a first class identifier of the entry and a class name referenced by the class file of the logical group matches a class name of a second class identifier of the entry. Accordingly, the class loader 140 may utilize the second class identifier from the entry that matched the class name referenced by the class file of the logical group to identify a dependent logical group in which the class file referenced by the class name should be retrieved and loaded into the allocated storage 126 for use by the application 122.

FIG. 2 illustrates an example build management data structure 200 for use in class loading of dependency class files using modified class identifiers, in accordance with embodiments of the present disclosure. Build management data structure 200 may include a plurality of entries. Each entry of the build management structure 200 includes a class file identifier 210 and a dependency class file identifier 220.

For each logical group of a plurality of logical groups, a class file management component (e.g. class file management component 130 of FIG. 1) may identify a dependent logical group referenced by a respective logical group. Class file management component may, for each class file of the respective logical group, identify a dependency class file of the dependent logical group referenced by a respective class file of the respective logical group, and append an entry to the build management data structure 200 including a class file identifier 210 associated with a class identifier of the respective class file of the respective logical group and a dependent class identifier 220 associated with a class identifier of the dependency class file of the dependent logical group.

For example, a logical group A may include class file A1-4. Logical group A depends on logical group B which includes class file B1-4. Class file management component may identify that class file A1 references class file B1 and append to the build management data structure 200 an entry including a class identifier (ID) of class file A1 as class file identifier 210 and a class identifier (ID) of class file B1 as dependency class file identifier 220. Class file management component may further identify that class file A2 references class file B2 and append to the build management data structure 200 an entry including a class identifier (ID) of class file A2 as class file identifier 210 and a class identifier (ID) of class file B2 as dependency class file identifier 220, and so on.

In operations, a class loader (e.g., class loader 140 of FIG. 1) may determine that a class file of a logical group (e.g., class file B2) identifies a class file by class name to be loaded. The class loader identifies an entry of the build management data structure 200 in which a class file identifier 210 matches a class identifier of the class file of the logical group (e.g., class file B2) and a class name portion of the dependency class file identifier 220 (e.g., class file C2) matches the class name referenced by the class file of the logical group. Accordingly, the class loader may retrieve and load a class file from the logical group C associated with the class identifier of class file C2.

Figure 3:
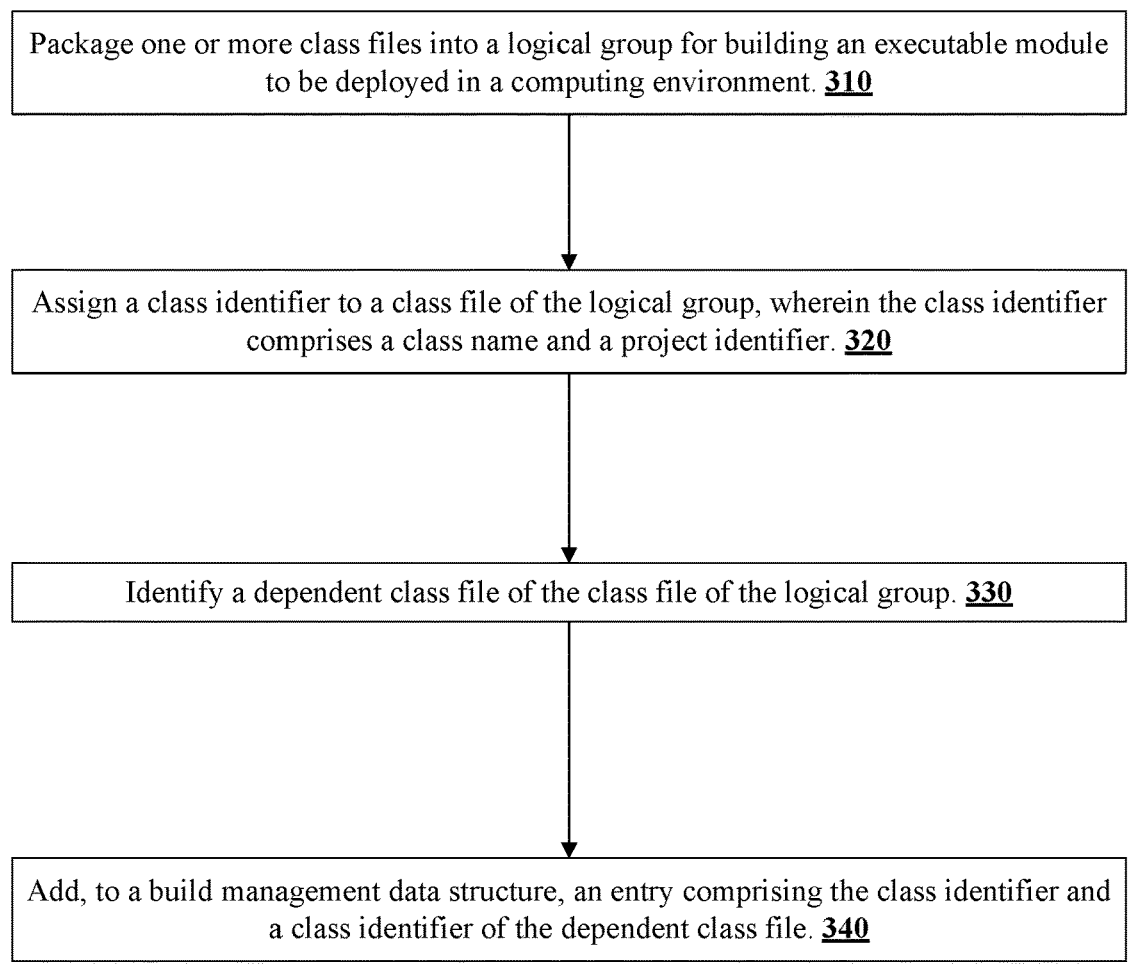
FIG. 3 is a flow diagram of a method for class loading of dependency class files using modified class identifiers, in accordance with embodiments of the present disclosure.

FIG. 3 depicts a flow diagram of an illustrative example of a method 300 for class loading of dependency class files using modified class identifiers, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. Term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

At block 310, the processing device packages one or more class files into a logical group for building an executable module to be deployed in a computing environment. At block 320, the processing device assigns a class identifier to a class file of the logical group, wherein the class identifier comprises a class name and a project identifier. The project identifier of the respective class file may include at least one of a group identification, an artifact identification, or a version identification. As previously described, one or more class files may be packaged into logical groups (e.g., an archive file, such as Java archive (.jar) files, web archive (.war) files, etc.). Each of the one or more class files in the logical group is provided a class identifier, which may include a class name, associated with the class file and a project identifier associated with the logical group the class file was packaged. The project identifier may be generated by a build automation tool (e.g., Maven) responsive to packaging of the one or more class file.

At block 330, the processing device identifies a dependency class file of the class file of the logical group. To identifying the dependency class file of the respective class file, the processing device identifies a dependent logical group referenced by the logical group. Based on the identified dependent logical group, the processing device identifies a dependency class file of the dependent logical group referenced by the respective class file of the logical group. At block 340, the processing device adds, to a build management data structure, an entry comprising the class identifier and a class identifier of the dependency class file. As previously described, for each logical group of a plurality of logical groups, a dependent logical group referenced by a respective logical group is identified and for each class file of the respective logical group, a dependency class file of the dependent logical group referenced by a respective class file of the respective logical group is identified. Thus, an entry may be appended and/or utilized by the class loader to the build management data structure including a class file identifier associated the respective class file of the respective logical group and a dependent class identifier associated with the dependency class file of the dependent logical group.

In some embodiments, responsive to receiving a request to load a target class file of a dependent logical group in response to loading a specific class file of a specific logical group, the processing device identifies, in the build management data structure, a subset of entries associated with the specific class file. As previously described, a class file of a logical group (e.g., the specific class file of the specific logical group) may identify a class file (e.g., target class file of a dependent logical group) by class name to be loaded. The specific logical group may be dependent on the dependent logical group. To identify, in the build management data structure, the subset of entries associated with the specific class file, the processing logic identifies each entry in which a class identifier of the specific class file matches the class identifier of the entry or a class name of the specific class file matches a class name portion of the class identifier of the entry.

Then, the processing devices loads the target class file identified by the class identifier of the target class file. To load the target class file identified by the class identifier of the target class file, the processing device identifies an entry of the subset of entries in which a class name associated with the target class file matches a class name portion of a class identifier of the dependency class file associated with the entry.

Figure 4:
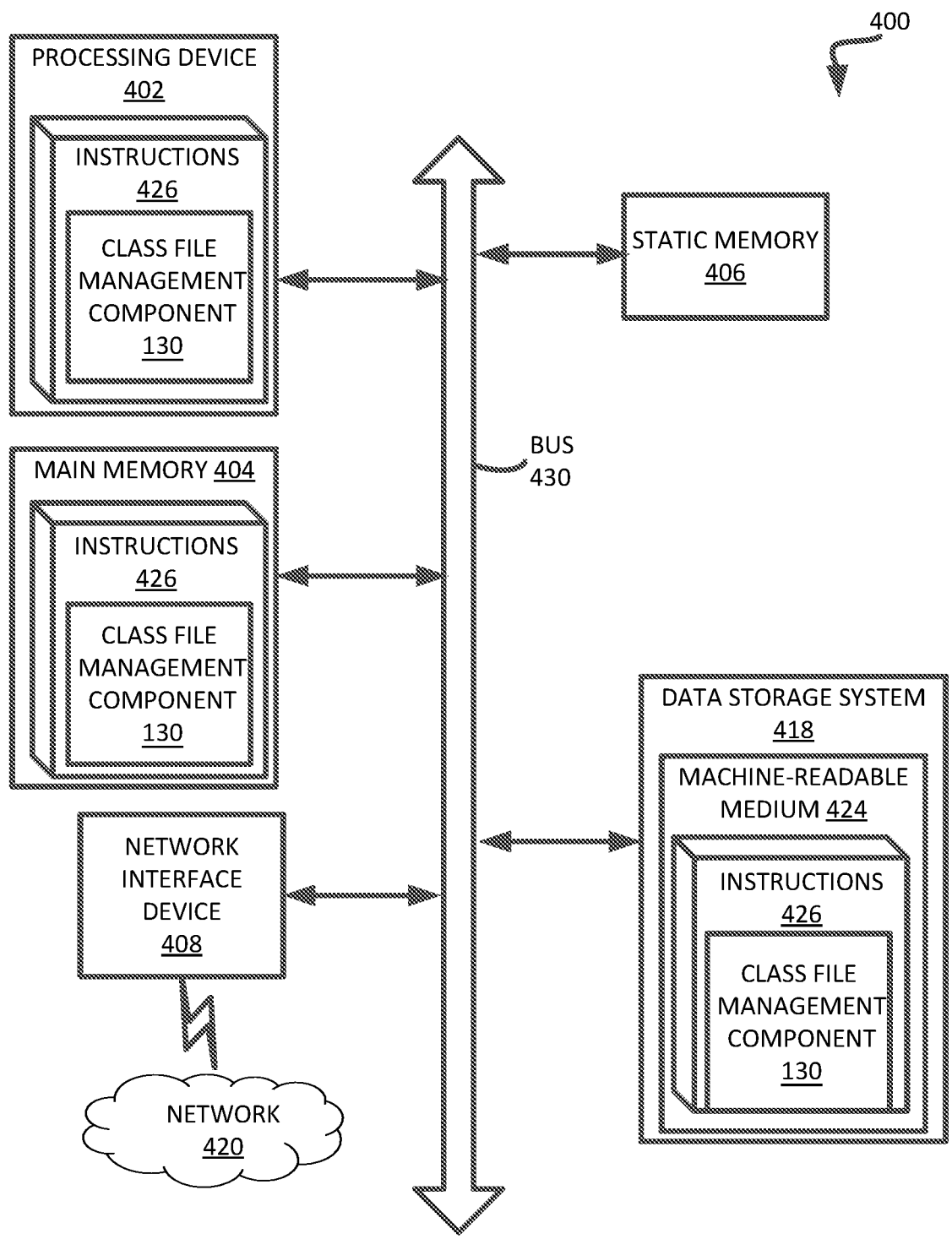
FIG. 4 is a block diagram illustrating a computing system in which implementations of the disclosure may be used.

FIG. 4 is a block diagram illustrating a computer system in which implementations of the disclosure may be used. In some implementations, the computer system 400 may support secured peripheral device communication via a bridge device in virtualized computer systems, in accordance with previously described embodiments.

Computer system 400 may be included within a data center that supports virtualization. Virtualization within a data center results in a physical system being virtualized using VMs to consolidate the data center infrastructure and increase operational efficiencies. A VM may be a program-based emulation of computer hardware of the virtualized data center. For example, VM may operate based on computer architecture and functions of computer hardware resources associated with hard disks or other such memory. VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

Computer system 400 includes a processing device 402, a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 416, which communicate with each other via a bus 408.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is to execute the instructions 426 for performing the operations and steps discussed herein.

Computer system 400 may further include a network interface device 422 communicably coupled to a network 425. Computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Instructions 426 may reside, completely or partially, within volatile memory 404 and/or within processing device 402 during execution thereof by computer system 400, hence, volatile memory 404 and processing device 402 may also constitute machine-readable storage medium 424.

Data storage device 416 may include a computer-readable storage medium 424 (e.g., a non-transitory computer-readable storage medium) on which may store instructions 426 encoding any one or more of the methods or functions described herein, including instructions for implementing method 300 of FIG. 3.

Non-transitory machine-readable storage medium 424 may also be used to store instructions 426 to support caching results of certain commands utilized for building multi-platform application container images described herein, and/or a software library containing methods that call the above applications. While the machine-accessible storage medium 424 is shown in an example implementation to be a single medium, the term "machine-accessible storage medium" should be taken to include a single medium or multiple media (e.g., a centralized or distributed database, and/or associated caches and servers) that store the one or more sets of instructions. Term "machine-accessible storage medium" shall also be taken to include any medium that is capable of storing, encoding or carrying a set of instruction for execution by the machine and that cause the machine to perform any one or more of the methodologies of the disclosure. Term "machine-accessible storage medium" shall accordingly be taken to include, but not be limited to, solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

What is claimed is:

1. A method, comprising:
   packaging one or more class files into a logical group for building an executable module to be deployed in a computing environment;
   assigning a class identifier to a class file of the logical group, wherein the class identifier comprises a class name and a project identifier;
   identifying a dependency class file of the class file of the logical group, wherein identifying the dependency class file of the class file comprises:
      identifying a dependent logical group referenced by the logical group; and
      identifying a dependency class file of the dependent logical group referenced by the respective class file of the logical group; and
   adding, to a build management data structure, an entry comprising the class identifier and a class identifier of the dependency class file.

2. The method of claim 1, wherein the project identifier of the respective class file comprises at least one of: a group identifier, an artifact identifier, or a version identifier.

3. The method of claim 1, further comprising:
   responsive to receiving a request to load a target class file of a dependent logical group in response to loading a specific class file of a specific logical group, identifying, in the build management data structure, a subset of entries associated with the specific class file; and
   loading the target class file identified by the class identifier of the target class file.

4. The method of claim 3, wherein the specific logical group is dependent on the dependent logical group.

5. The method of claim 3, wherein identifying, in the build management data structure, the subset of entries associated with the specific class file includes:
   identifying each entry in which a class identifier of the specific class file matches the class identifier of the entry or a class name of the specific class file matches a class name portion of the class identifier of the entry.

6. The method of claim 5, wherein loading the target class file identified by the class identifier of the target class file includes:
   identifying an entry of the subset of entries in which a class name associated with the target class file matches a class name portion of a class identifier of the dependency class file associated with the entry.

7. A system comprising:
   a memory device;
   a processing device, operatively coupled to the memory device, to perform operations comprising:
      packaging one or more class files into a logical group for building an executable module to be deployed in a computing environment;
      assigning a class identifier to a class file of the logical group, wherein the class identifier comprises a class name and a project identifier;
      identifying a dependency class file of the class file of the logical group, wherein identifying the dependency class file of the class file comprises:
         identifying a dependent logical group referenced by the logical group; and
         identifying a dependency class file of the dependent logical group referenced by the respective class file of the logical group; and
      adding, to a build management data structure, an entry comprising the class identifier and a class identifier of the dependency class file.

8. The system of claim 7, wherein the project identifier of the respective class file comprises at least one of: a group identification, an artifact identification, or a version identification.

9. The system of claim 7, further comprising:
   responsive to receiving a request to load a target class file of a dependent logical group in response to loading a specific class file of a specific logical group, identifying, in the build management data structure, a subset of entries associated with the specific class file; and
   loading the target class file identified by the class identifier of the target class file.

10. The system of claim 9, wherein the specific logical group is dependent on the dependent logical group.

11. The system of claim 9, wherein identifying, in the build management data structure, the subset of entries associated with the specific class file includes:
    identifying each entry in which a class identifier of the specific class file matches the class identifier of the entry or a class name of the specific class file matches a class name portion of the class identifier of the entry.

12. The system of claim 11, wherein loading the target class file identified by the class identifier of the target class file includes identifying an entry of the subset of entries in which a class name associated with the target class file matches a class name portion of a class identifier of the dependency class file associated with the entry.

13. A non-transitory machine-readable storage medium including instructions that, when executed by a processing device, cause the processing device to perform operations comprising:
    packaging one or more class files into a logical group for building an executable module to be deployed in a computing environment;
    assigning a class identifier to a class file of the logical group, wherein the class identifier comprises a class name and a project identifier;
    identifying a dependency class file of the class file of the logical group, wherein identifying the dependency class file of the class file comprises:
       identifying a dependent logical group referenced by the logical group; and
       identifying a dependency class file of the dependent logical group referenced by the respective class file of the logical group; and
    adding, to a build management data structure, an entry comprising the class identifier and a class identifier of the dependency class file.

14. The non-transitory machine-readable storage medium of claim 13, wherein the project identifier of the respective class file comprises at least one of: a group identification, an artifact identification, or a version identification.

15. The non-transitory machine-readable storage medium of claim 13, further comprising:
    responsive to receiving a request to load a target class file of a dependent logical group dependent on a specific class file of a specific logical group, identifying, in the build management data structure, a subset of entries associated with the specific class file; and
    loading the target class file identified by the class identifier of the target class file.

16. The non-transitory machine-readable storage medium of claim 15, wherein identifying, in the build management data structure, the subset of entries associated with the specific class file includes:

identifying each entry in which a class identifier of the specific class file matches the class identifier of the entry or a class name of the specific class file matches a class name portion of the class identifier of the entry.

17. The non-transitory machine-readable storage medium of claim 15, wherein loading the target class file identified by the class identifier of the target class file includes:

identifying an entry of the subset of entries in which a class name associated with the target class file matches a class name portion of a class identifier of the dependency class file associated with the entry.

\* \* \* \* \*